United States Patent [19]

Lewis, deceased et al.

[11] 4,454,658

[45] * Jun. 19, 1984

[54] DEVICE TO LOCATE COMMUNICATION SATELLITES

[76] Inventors: Donald F. Lewis, deceased, late of Grass Valley, Calif.; by Sheri Lewis, administrator, 105 Rockwood Dr., Grass Valley, Calif. 95945

[*] Notice: The portion of the term of this patent subsequent to Sep. 15, 1998 has been disclaimed.

[21] Appl. No.: 300,966

[22] Filed: Sep. 10, 1981

Related U.S. Application Data

[63] Continuation-in-part of Ser. No. 033,110, Apr. 25, 1979, Pat. No. 4,288,922.

[51] Int. Cl.³ .............................................. G01C 1/00
[52] U.S. Cl. ...................................... 33/268; 33/273
[58] Field of Search ............ 33/1 DD, 268, 272, 273, 33/270, 271, 269

[56] References Cited

U.S. PATENT DOCUMENTS

| | | | |
|---|---|---|---|
| 1,817,350 | 8/1931 | Clay | 33/1 DD |
| 2,478,315 | 8/1949 | Pollman | 33/1 DD |
| 2,884,697 | 5/1959 | Sylvester | 33/1 DD |
| 4,177,566 | 12/1979 | Haines | 33/1 DD |
| 4,288,922 | 9/1981 | Lewis | 33/268 |

Primary Examiner—William D. Martin, Jr.
Attorney, Agent, or Firm—Manfred M. Warren; Robert B. Chickering; Glen R. Grunewald

[57] ABSTRACT

A device to locate the position of a communication satellite with respect to a specific site on the earth's surface including a transparent screen having markings to indicate the positions of one or more satellites for that site with respect to a horizontal platform and a north orientation, a table including an arcuate means to mount the screen, a wide-angle viewer fixed to the table with its axis perpendicular to the tangent of the arcuate means at its south position, a compass fixed to the table oriented with north-south parallel to the axis of the wide-angle viewer and a level to indicate when the tabletop is horizontal.

3 Claims, 4 Drawing Figures

DEVICE TO LOCATE COMMUNICATION SATELLITES

CROSS REFERENCE

This application is a continuation-in-part of my copending application, Ser. No. 33,110, filed Apr. 25, 1979, now U.S. Pat. No. 4,228,922.

BACKGROUND OF THE INVENTION

Communication with electromagnetic waves between a transmitter and a receiver is very common. Frequently, especially with shorter waves, communication is limited to line-of-sight and the horizon is the natural limit to how far such communications can be made between a transmitter and a receiver. In such cases, the distance of transmission can be extended by means such as putting the transmitter's antenna on a high hill, transmitting to one or more receivers which are equipped to retransmit to other receivers, or transmitting via cable which carries transmissions to an antenna within line-of-sight of receivers. The most successful means to extend the horizon for a transmission of electromagnetic waves is to transmit them to a communications satellite whicn in turn retransmits back to earth. A single satellite located high above the earth has a transmission horizon that is substantially half the surface of the earth. Many such communication satellites now exist.

Communication satellites largely are in substantially the same orbit and they are placed in orbit at a height and speed such that they hover above a specific spot on earth. To receive communications retransmitted from a satellite it is necessary to use a highly directional antenna and to aim it accurately toward the satellite. In addition to aiming the antenna accurately toward the satellite whose communications are desired, it is also necessary to locate the directional antenna so that no solid object such as a structure or a mountain or even a large tree is between the antenna and the satellite.

SUMMARY OF THE INVENTION

This invention is a device for locating the position of a communication satellite with respect to a specific site on the earth's surface. The device of this invention is simple, inexpensive, and portable. The device of this invention includes a flat table having means on it for attaching a flexible, transparent screen along a horizontal arc that is preferably circular.

The device of this invention also includes a transparent screen which is fixed to the means for attaching it in such a manner that it stands up perpendicular to the top of the table. The screen is provided with markings which indicate the position of one or more satellites at a given latitude and longitude with respect to the north-south orientation of the table.

The table is also provided with a wide angle viewer fixed to the opposite side of the table from the screen and with the axis of the viewer being perpendicular to the tangent of the screen at the position where the screen will be true south when the device is in use.

The table is also provided with a compass fixed to its upper surface with the north-south axis aligned parallel to the axis of the wide angle viewer, and the table is provided with a level positioned to indicate when the upper surface of the table is in a horizontal plane.

In other, and preferred embodiments of the invention, the bottom of the table is provided with means to fix it to a tripod, the upper surface of the table is marked with compass points adjacent to where the screen is held and it may also be marked with instructions or with tabulated data providing such information as the deviation between true north and magnetic north for different locations on the earth, data for identifying various satellites, or with other useful information.

DETAILED DESCRIPTION OF THE INVENTION

This invention will be described with reference to the accompanying drawings.

Figure 1:
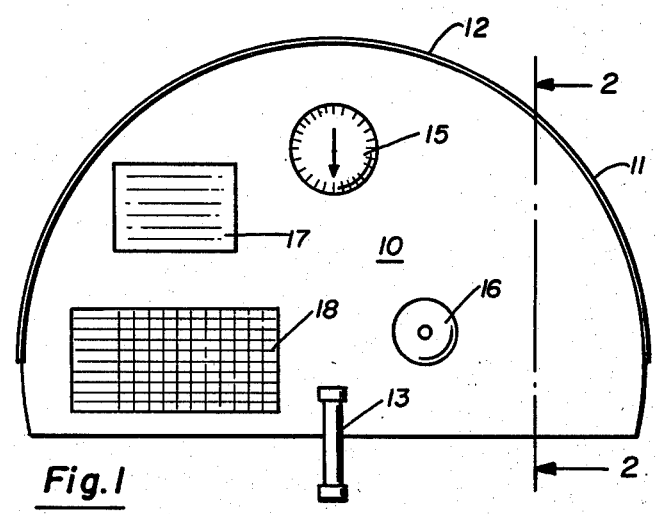
FIG. 1 is a plan view or a device embodying this invention.

The device illustrated in the drawings includes a table 10 having a flat upper surface. The table 10 is provided with an arcuate means, in this case one entire side of the table which is a circular arc identified generally as 11. Fixed to the arcuate means is a transparent screen 12 which is illustrated in its orientation during use in FIGS. 1, 2 and 3 and illustrated in its flat condition in FIG. 4. The transparent screen is preferably made of material that is stiff but flexible, such as celluloid, and it may be held to the arcuate means by any suitable means such as being inserted in a groove, held with thumb screws or the like.

A wide-angle telescope or viewer 13 is fixed to the table 10 opposite the transparent screen so that the axis of the wide-angle viewer is perpendicular to the tangent of the transparent screen at the portion of the transparent screen marked as its midpoint. A compass 15 is also fixed to the upper surface of the table 10 with its north-south orientation either on the same axis or an axis parallel to the axis of the wide-angle view 13. The table-top is also provided with a level 16 which indicates when the upper surface or the table is horizontal. In preferred embodiments, the tabletop may be provided with printed instructions 17 and tabular data 18 to increase the ease with which the device is used.

Figure 4:
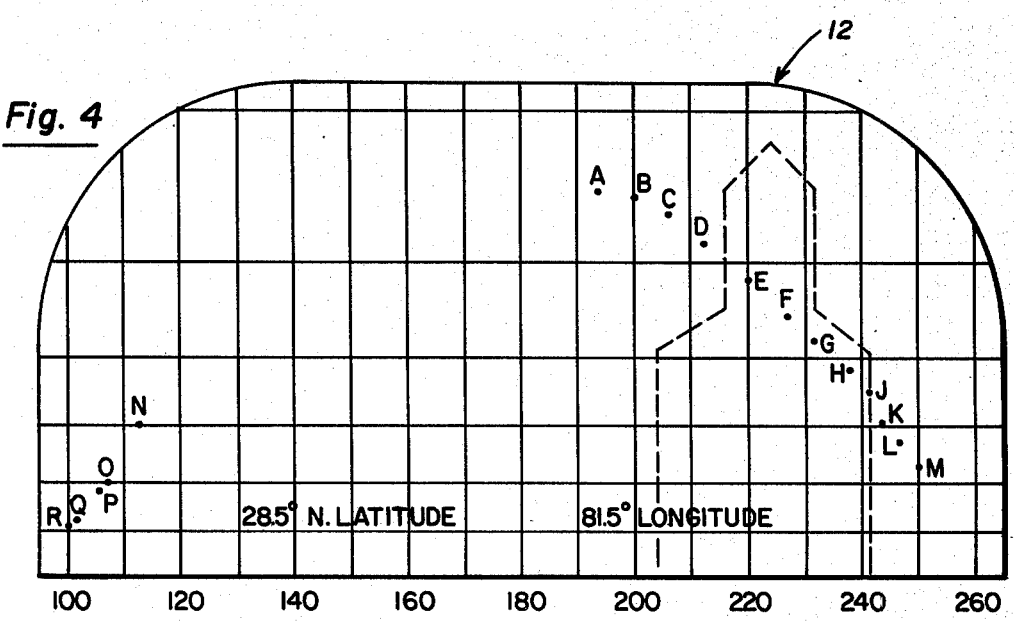
FIG. 4 is an elevation view of one transparent screen useful with the device of this invention, the transparent screen of FIG. 4 being in a flat rather than an arcuate position.

The transparent screen in flat position is illustrated in FIG. 4. For ease of use the transparent screen is provided with a rectilinear pattern and it has marked on it, with small circular dots, the location of each communication satellite that is "visible" from the site at which the device of this invention is being used. Each of the dots is identified, in this case with a letter, which will relate the dot to a particular satellite that can be identified from data written on the tabletop or from other reference material.

It can be seen from the drawing that this particular screen will locate the positions of satellites from a site on the earth's surface at 28.5° north latitude and 81.5° longitude which is approximately in Maitland, Fla. Screens may be prepared with a number of orbit lines for different latitudes and may even be prepared with dots on horizontal lines representing the position of a particular satellite at different longitudes. Normally, a screen at every 0.5° latitude and at every 0.5° longitude will be adequate to locate satellites accurately enough to avoid obstacles to their transmissions, however, if two or more latitude orbit lines and a number of horizontal dots at different longitudes are on the screen, interpolation may be used to locate satellites with greater accuracy with respect to any position encompassed by the screen. Screens for different latitudes and longitudes can be used with the same table and can be interchanged simply by mounting them on the arcuate means that is an element of the table.

The screen is also marked with compass points from 100° to 260° and should be aligned with corresponding markings on the table surface or with a hairline in the compass that establishes where 180° on the screen should be located in the arcuate holding means on the table. In a preferred embodiment the table will be marked with compass points so that deviations from true north can be taken into account and tables embodying this invention can be oriented with precision regardless of the site on the earth's surface where they are used.

Between about 204° and 242° there is illustrated in FIG. 4 in broken lines a structure that could be an industrial building, a grain elevator, a church or the like. It may be seen from this illustration that, at the particular site on the ground where the screen illustrated in FIG. 4 is being viewed, satellites identified as E, F, G, H, and J could not transmit directly to a dish antenna located at that site. If one wished to receive communications from those satellites a dish antenna would have to be positioned somewhere else on the ground to avoid interference from the structure. One could also receive communications from those satellites by raising the elevation of the dish antenna so that all of the satellites will fall above any part of the structure.

The use of a rectilinear pattern on the screen illustrated in FIG. 4 is a preferred embodiment of the invention. Unlike other astronomical bodies, additional communication satellites can be put in orbit and one employing the screen of this invention may wish to add the positions of new communication satellites to the screen. This could be done either by buying a new screen having the positions of new satellites on it, or obtaining the locations of new satellites and marking them on the existing screen. For example, if a new satellite were put into orbit at a 150° compass point and 28 units above the horizon, one having possession of the screen illustrated in FIG. 4 could simply add a suitable mark to that location on the screen and thereby be able to locate the new satellite and determine whether there is an obstruction between a dish antenna and the new satellite at a proposed site for the antenna.

Figure 2:
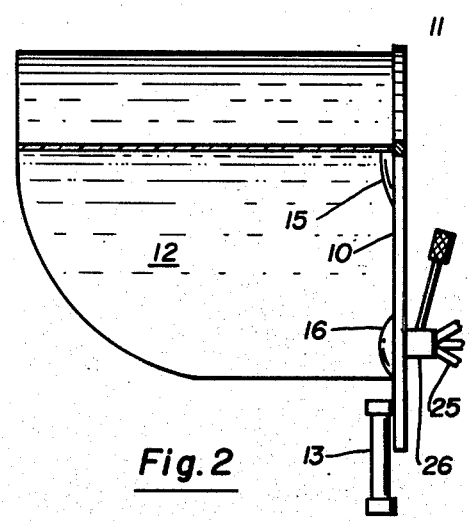
FIG. 2 is a cross-section of the device illustrated in FIG. 1 taken along the line 2—2 in the direction of the arrows.
Figure 3:
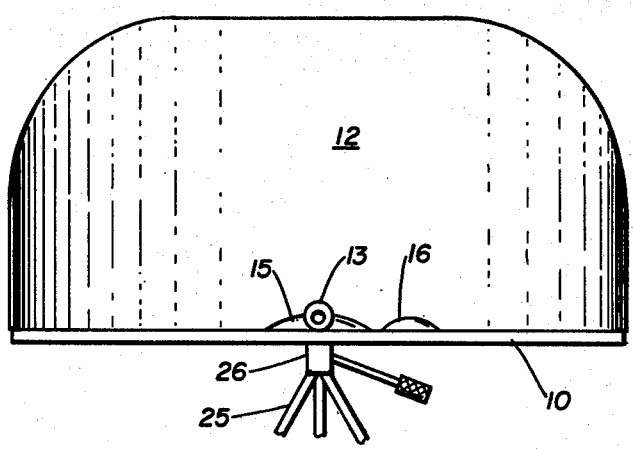
FIG. 3 is a front elevation view of the device illustrated in FIG. 1.

In use, the device of this invention is provided with a transparent screen for approximately the latitude and longitude of the site being investigated. The screen is mounted on the device of this invention as illustrated in FIGS. 1 through 3 and the device is mounted, preferably on tripod 25 which desirably has a swivel mechanism 26 such as those known in the art for easily positioning the device of this invention in any horizontal or vertical orientation. The table 10 is positioned with its top in a horizontal plane and with the wide-angle viewer 13 at the northern end of the table. The compass 15 may be employed to orient the table in a north-south direction, and with suitable data which may be contained in the tabular data compilation 18, adjustments of the north-south orientation of the table may be made to accommodate to deviations between magnetic north and true north. When the tabletop is oriented properly with regard to being horizontal and with the axis of wide-angle viewer 13 in a true north-south direction, viewing southward through the wide-angle viewer will provide the information concerning the location of communication satellites.

What is claimed is:

1. A device useful to locate the position of communication satellites comprising:
   a flat table having arcuate means adapted to receive a stiff, flexible material;
   a transparent screen made of stiff, flexible material fixed to said arcuate mean with said transparent screen having markings indicating the location of communication satellites at a given latitude and longitude with respect to the north-south orientation of said table;
   a wide-angle viewer fixed to said table in a position to view said screen with the axis of the wide-angle viewer perpendicular to the tangent of said screen at the south position;
   a compass fixed to said table with north-south axis aligned parallel to the axis of said wide-angle viewer; and
   a level positioned to indicate the horizontal orientation of the upper surface of said table.

2. The device of claim 1 having means below said table to fix said device to a tripod.

3. The device of claim 1 having the upper surface of said table marked with information.

* * * * *